United States Patent [19]

Lorteije et al.

[11] 4,171,524

[45] Oct. 16, 1979

[54] DISPLAY DEVICE HAVING A MATRIX OF GAS DISCHARGE DISPLAY ELEMENTS

[75] Inventors: Jean H. J. Lorteije; Geert Warrink; Gerhard H. F. deVries; Jacques A. M. Hulshof, all of Eindhoven, Netherlands

[73] Assignee: U.S. Philips Corporation, New York, N.Y.

[21] Appl. No.: 835,734

[22] Filed: Sep. 22, 1977

[30] Foreign Application Priority Data

Dec. 29, 1976 [NL] Netherlands ............... 7614514

[51] Int. Cl.$^2$ .............................................. H01J 17/48
[52] U.S. Cl. ................... 340/713; 315/169.4; 340/768; 340/771
[58] Field of Search ............ 340/324 M; 315/169 TV

[56] References Cited

U.S. PATENT DOCUMENTS

| | | | |
|---|---|---|---|
| 3,919,591 | 11/1975 | Criscimagna | 340/324 M |
| 3,969,718 | 7/1976 | Strom | 340/324 M |
| 4,053,812 | 10/1977 | Kaji et al. | 315/169 TV |

Primary Examiner—David L. Trafton
Attorney, Agent, or Firm—Thomas A. Briody; William J. Streeter; Bernard Franzblau

[57] ABSTRACT

In a matrix of display elements arranged in rows and columns having row scanning and column selection, all display elements which are connected to a scanned row conductor are always ignited such that the non-selected display elements of that row receive a low quiescent current through quiescent current supply circuits in the column selection circuits and the selected display elements receive a higher display current through selection circuits in the column selection circuits.

The low quiescent currents reduce the ignition-voltage required for the next following row to be scanned while a high contrast is produced between the selected and non-selected display elements.

10 Claims, 4 Drawing Figures

DISPLAY DEVICE HAVING A MATRIX OF GAS DISCHARGE DISPLAY ELEMENTS

The invention relates to a display device having a matrix of gas discharge display elements each having a first and a second supply electrode which display elements have a bistable current-voltage characteristic, a control circuit having a plurality of row conductors and a plurality of column conductors, the first supply electrode of each display element being connected to one of the row conductors and the second supply electrode to one of the column conductors in such a way that each display element couples a different combination of a row conductor and a column conductor. Such a display device also includes a row scanning circuit for successively periodically scanning the row conductors and a plurality of column selection circuits for selecting those display elements which must be energized with a display current in a period in which a row conductor is scanned. These column selection circuits effect, at the beginning of the scan of a row conductor, the excitation of all of the display elements connected to the scanned row conductor.

United Kingdom Pat. Specification No. 14 14 340 discloses a display device of the above-mentioned type wherein all display elements which are connected to a scanned row conductor are excited with a voltage which exceeds the ignition-voltage of those display elements and start carrying a current the value of which is at least equal to the display current which is required for a selected display element. By means of a plurality of selection circuits the selection is made as to which display elements should be excited for obtaining a desired display pattern. In these display elements the display current is maintained during the entire period in which a row conductor is scanned. The remaining display elements which are connected to the scanned row conductor are extinguished shortly after starting by means of a plurality of erase driver circuits. For the display elements display elements are chosen which have a bistable characteristic so that excitation after ignition can be maintained with an operating voltage which is lower than the ignition-voltage thereby preventing the non-selected display elements restarting after they were extinguished. The ignition time has been chosen such that the slowest display element still ignites reliably. As a result the faster display elements already attain the display current value within the starting time chosen or even exceed this value owing to the higher ignition-voltage still present. These currents are also carried by non-selected display elements so that the contrast obtained with the display device between the selected and non-selected display elements is low.

Igniting the display elements requires a high ignition-voltage which, together with the high ignition-current of the display element causes a high energy loss. Furthermore the circuits used must be able to withstand the high voltages.

It is an object of the invention to provide a display device having another organization of the row scanning circuit and the column selection circuits so that the current through the display elements is built up in a more advantageous manner so that lower ignition-voltages will suffice and, at the same time, a high contrast is achieved because the average display level of the non-selected display elements is negligible relative to the display level of the selected display elements.

In a display element of the aforesaid type according to the invention the display elements are disposed together in a gas-filled space and each column selection circuit comprises a quiescent current supply circuit which couples a column conductor to a d.c. voltage source for applying a quiescent current so that a quiescent current is supplied also to non-selected display elements which are connected to the scanned row conductor during the period wherein the row conductor is scanned. This quiescent current has such a low value that the display level of the non-selected display elements has a negligible influence on the observation of a formed display pattern.

A first advantage of this quiescent current circuit is that all display elements which are connected to a scanned row conductor are ignited during the entire scanning period. The gas discharge comprises both ionized atoms and metastable atoms. The metastable atoms, that is to say atoms which are excited to a higher energy level, are not loaded and diffuse to nearby display elements. If, during the sequential energizing of row conductors the current through a row of display elements is interrupted, a plurality of ionized atoms will furthermore be attracted by the energizing voltage of the following row of display elements. These transports of atoms and ions are possible because the display elements are disposed together in a gas-filled enclosure. The ionized and excited atoms present at this following row require a lower ignition voltage for this row than that which is required if display elements of the preceding row have already been extinguished at an earlier moment.

A second advantage is that owing to this ignition-voltage reduction, which is greatest for the two row conductors which are situated next to the scanned row conductor in a matrix of display elements, use can be made of the self-scanning principle without the necessity of providing the display elements with auxiliary electrodes provided that a next scanning pulse is not supplied to the row conductor which was just scanned or to the preceding one, but is supplied to the next one.

A third advantage is that the quiescent energy which a non-selected display element absorbs and gives off again partly in the form of visible radiation can be set to a very low value by choosing a high resistance value for the quiescent current supply circuit and, in addition, owing to the low quiescent current, a lower operating voltage is established than the operating voltage which is required for the display current. It appears that the quiescent current which is required to attain a sufficient pre-ionization is so low that a contrast of approximately 50:1 can be achieved between selected and non-selected display elements without the necessity of making the scanning time much longer than the ignition-time of the slowest display elements. Therefore, with an ignition-time of, for example, 8 to 10 microseconds a row scanning time of, for example, 64 microseconds can be used, as is required for the display of television pictures. With prior art circuits the scanning time should be at least 50 times as long as the ignition-time to achieve the same contrast, often, however, a period of time which is 100 to 400 times longer is used.

The invention will now be further explained with reference to the accompanying drawing. In the drawing.

In these Figures corresponding components have been given the same reference numerals.

Figure 1:
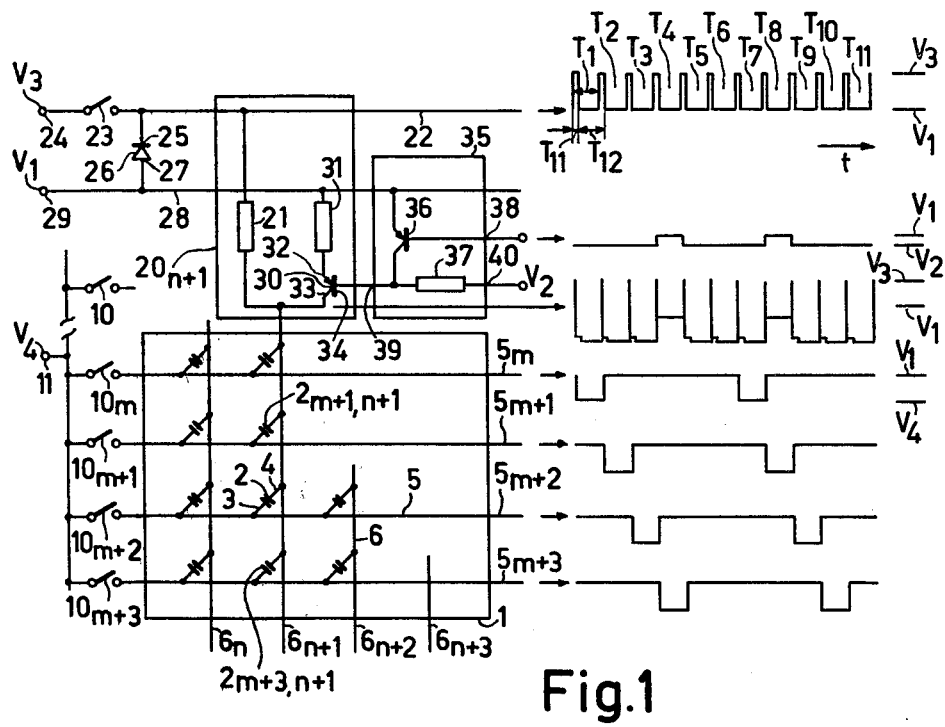
FIG. 1 shows a simplified circuit diagram of a display device according to the invention wherein an additional supply voltage for igniting display elements is supplied through a plurality of column conductors.

In FIG. 1 the display device comprises a matrix 1 of display elements 2 having k rows and l columns, only a part of which is shown. The display elements have a first supply electrode 3 and a second supply electrode 4 which supply electrodes 3, 4 are each connected to one of a plurality of row conductors 5 and to one of a plurality of column conductors 6 respectively, such that all first supply electrodes 3 of the display elements $2_{i,j}$ (i=1, 2, 3, ...k) are connected to the row conductor $5_i$ and all second supply electrodes 4 of the display elements $2_{i,j}$ (j=1, 2, 3, ...l) to the column conductor $6_j$.

In the Figures the display elements are shown diagrammatically. In general the row conductors and the column conductors constitute at the same time the supply electrodes of the display elements. To this end the conductors are placed in a closed space which is filled with a gas or a gas mixture which is suitable for generating gas discharges. At the intersections of row conductors and column conductors gas discharges can be produced at a sufficient excitation for which purpose the conductors are fed through the wall of the closed space in an insulating manner. This wall is transparent at at least one side to enable visual observation of a display pattern. The column conductors form the anodes of the display element and the row conductors form the cathodes.

Each row conductor can be excited by coupling the row conductor through one of a plurality of row scanning switches 10, for example semiconductor switching amplifiers, to a supply input 11 of the display device to which a supply voltage $V_4$ can be supplied. Each column conductor 6 can be excited by means of one out of a plurality of column selection circuits 20, only one of which is shown. Each column selection circuit 20 comprises a quiescent current supply circuit consisting of a resistor 21 which couples the associated column conductor 6 to a conductor 22. The conductor 22 is coupled through a switch 23, for example a semiconductor switch, to a supply input 24 of the display device to which a supply voltage $V_3 > V_4$ can be supplied. In addition, the conductor 22 is connected to the cathode 25 of a diode 26 whose anode 27 is connected to a conductor 28 to which a supply voltage $V_1 < V_3$ can be supplied through a supply input 29 of the display device. If the switch 23 is closed the conductor 22 carries the voltage $V_3$ so that the diode 26 is blocked. If the switch 23 is non-conducting and the column selection circuits carry current through a scanned row conductor and the display elements connected thereto the diode is conducting and the conductor 22 carries a voltage approximately equal to $V_1$. The switch 23 is periodically closed during a duty cycle $T_{i1}$ of each scanning period $T_i$ (i=1, 2, 3, ...11 as shown) and opened during a duty cycle $T_{i2} = T_i - T_{i1}$.

The switches 10 are alternately and successively closed during a cycle duration of the successive cycles $T_i$ and remain opened thereafter for a number of cycles.

If the ignition-voltage of a display element with a weak pre-ionisation is $V_o$ and the nominal operating voltage $V_n$, having, owing to the tolerance differences between display elements, the extreme values $V_{o\ min}$ and $V_{o\ max}$ and $V_{n\ min}$ and $V_{n\ max}$ respectively then the supply voltages must satisfy the following conditions.

$$V_{o\ max} \leq V_3 - V_4$$

$$V_{n\ max} \leq V_1 - V_4$$

The circuit operates as follows. During the period $T_1$ the switch $10_m$ is closed and the row conductor $5_m$ is at the voltage $V_4$. During the first part $T_{11}$ of the period $T_1$ all resistors 21 are coupled to the voltage $V_3$. As the difference voltage is $V_3 - V_4 \geq V_{o\ max} \geq V_{o(i,j)}$ all display elements $2_{m,j}$ will ignite. The current through the display elements is limited to a low value by the choice of the resistors 21 which serve as series resistors for the display elements. During the second part $T_{12}$ of the period $T_1$ the display elements $2_{m,j}$ remain energized through the resistors with a voltage $V_1 - V_4$. As $V_1 - V_4 \geq V_{n\ max}$ the display elements $2_{m,j}$ consequently remain in the ignited state. At the end of the period $T_1$ and the beginning of the period $T_2$ the switch $10_m$ opens and switch $10_{m+1}$ closes, so that the display elements $2_{m,j}$ extinguish and the display elements $2_{m+1,j}$ ignite etc.

In the column selection circuits 20 the column conductors 6 are thereafter coupled through series arrangements of a selection switch 30, in this case a pnp-transistor, and a resistor 31 to the conductor 28. The resistor 31 is connected between the conductor 28 and the emitter 32 of the transistor 30 whose collector 33 is connected to the associated column conductor 6. The base 34 of the transistor 30 is controlled by a gate circuit 35, in this case a transistor 36 having a collector resistor 37, an emitter connected to the conductor 28 and a base connected to the input 38 of the gate circuit 35. The collector of transistor 36 is connected to one side of resistor 37 and through the output 39 of the gate circuit 35 to the base 34 of the transistor 30. The other side of resistor 37 is connected to a supply input 40 of the gate circuit to which a supply voltage $V_2$ can be supplied. A logic control circuit, not shown, supplies a selection signal to the input 38 of the gate circuit 35 the voltage of which is equal, or approximately equal, to $V_1$ if the associated column conductor is selected and equal, or approximately equal, to $V_2$ if this column conductor is not selected. If this input voltage is equal to $V_1$ then the output voltage at the output 39 is approximately equal to $V_2$ and, consequently, the transistor 30 conducts. The resistor 31 serves as emitter resistor for the transistor 30 so that the voltage at the emitter 32 substantially follows the voltage at the base 34 and becomes approximately equal to $V_2$. The difference voltage $V_1 - V_2$ and the resistance value of the resistor 31 determine the current through the series arrangement 30, 31 substantially independent of the voltage at the collector 33 of the transistor 30 as long as the collector voltage is more negative than the base voltage. So the series arrangement operates as a current source for the selected display element 2 if $$V_4-V_{n\ max}<V_2<V_1,$$

so that the display current is substantially independent of tolerance differences between the operating voltages associated with the normal display current of the display elements.

In the case shown in the drawing the column conductor $6_{n+1}$ is selected during the periods $T_4$ and $T_8$. During the period $T_4$ the row conductor $5_{m+3}$ is energized so that the display element $2_{m+3,n+1}$ lights up brightly during this period. Likewise, $2_{m+1,n+1}$ lights up brightly during $T_8$. In the remaining periods $T_1$ to $T_3$ inclusive, $T_5$ to $T_7$ inclusive and $T_9$ to $T_{11}$ inclusive the transistor 36 conducts and the transistor 30 is cut-off so that only a quiescent current is supplied through the resistor 21 and the column conductor $6_{n+1}$ to always one of the display elements $2_{i,n+1}$.

The remaining column conductors are energized in a corresponding manner through associated column selection circuits by means of selection pulses so that during each period all display elements of a row light up, weakly if the associated column conductor is not selected and brightly if it is selected, while the display elements of the remaining rows are all extinguished. In this manner a 1:$k^{th}$ portion of the desired display pattern is formed during a scanning period.

If all row conductors have been scanned a full display pattern has been formed. Herewith it is desired to choose the scanning frequency so high that the picture repitition frequency exceeds the so-called flicker frequency of the human eye so that a visually quiet picture is obtained.

After the completion of a full picture the row conductor $5_l$ must be scanned after the row conductor $5_k$. The display elements connected with this row conductor have not been pre-ionized by an adjacent row of ignited display elements. This can be accomplished by disposing, in known manner, an additional row conductor $5_o$ next to the row conductor $5_l$ as a so-called reset cathode. With the column conductors this reset cathode constitutes a plurality of L gas discharge elements which are ignited prior to the beginning of a new picture cycle with a sufficiently high ignition-voltage. In general these gas discharge elements are shielded from visual observation as, owing to the higher ignition-voltage some elements achieve a current which exceeds the desired quiescent current through the display elements of the remaining row also when none of the column conductors is selected in the reset period.

If so desired the row conductors may, for example, by means of resistors, be supplied with a bias voltage so that the non-scanned row conductors can lose any residual charges. This bias voltage should be so much more positive than $V_4$ that parasitic ignitions cannot occur.

If so desired the row scanning switch $10_1$ also can be connected to a more negative voltage than $V_4$. This is on the one hand, cheaper than using a reset cathode. On the other hand incidentially occurring higher quiescent currents in the first row of display elements may cause a reduction in contrast.

If the display of so-called "picture half tones" is required by, for example, television pictures of facsimile transmission then this can be achieved by modulating the current through the display elements. Both amplitude modulation and pulse width modulation or a combination thereof is possible. Amplitude modulation is obtained by varying the supply voltage $V_2$, pulse width modulation is obtained by making the selection pulses shorter than the scanning period $T_i$.

These modulation methods can also be used for changing the average picture brightness, for example to match the brightness of the display patterns to the ambient brightness.

It is easy to see that the moment at which the row-scanning switch $10_m$ is opened and the row scanning switch $10_{m+1}$ is closed a plurality of other row scanning switches may be closed simultaneously with the row scanning switch $10_{m+1}$, for example the row scanning switches $10_{m+4}$, $10_{m+7}$ etc. The display elements associated with these rows have been pre-ionized to a much lower degree than the display elements associated with row $m+1$ and, consequently, require a higher ignition-voltage. As a result the display elements of the row $m+1$ can ignite easier than those of the remaining simultaneously scanned rows. As soon as this happens a voltage drop is produced across the resistors 21 or the series arrangement 30, 31 which causes the voltage between column conductors and energized row conductors to decrease to the operating voltage of the display elements, so that the ignitions cannot propagate any further along the column conductors.

Figure 2:
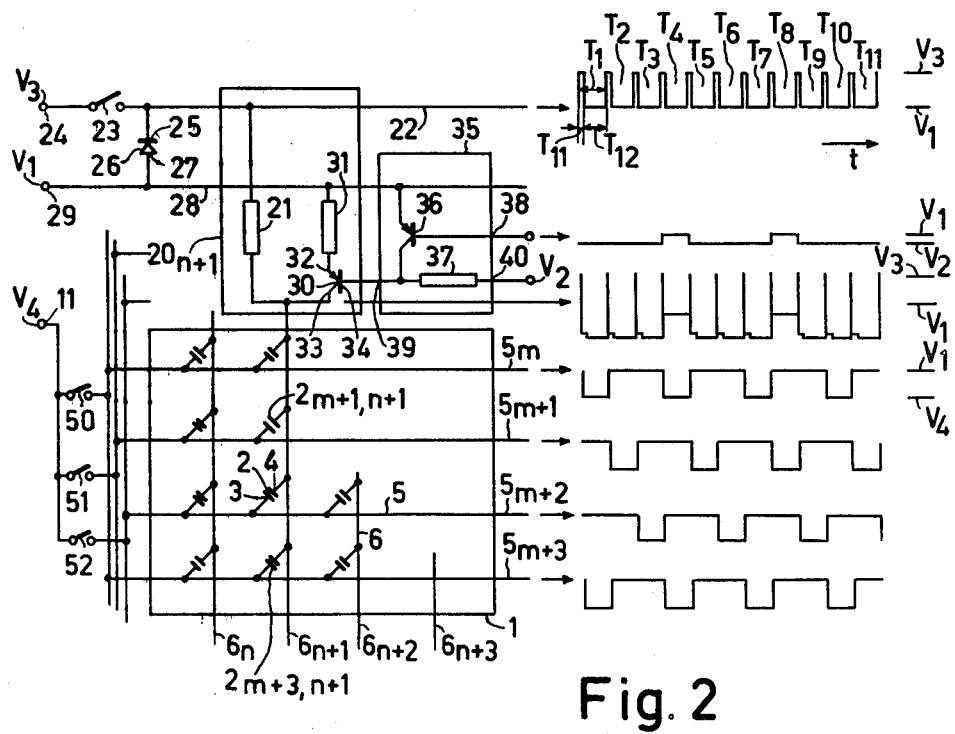
FIG. 2 shows by means of a simplified circuit diagram a similar display device to that in FIG. 1 but with row conductors which are interconnected in groups for using the self-scanning principle.

FIG. 2 shows a circuit according to the invention wherein all switches which may be operated in parallel in each case are combined into one switch. Herewith the row conductors 1, 4, 7, . . . m, m+3, . . . etc. are mutually interconnected and coupled together through a scanning switch 50 to the supply input 11 of the display device. Likewise the row conductors 2, 5, 8, . . . m+1, m+4 . . . etc. are coupled through a scanning switch 51 to the supply input 11 as are the remaining row conductors 3, 6, 9, . . . m+2, m+5, . . . etc. through a scanning switch 52.

In the example of the drawing the scanning switch 50 is closed during the scanning periods $T_1$, $T_4$, $T_7$ and $T_{10}$, the scanning switch 51 during $T_2$, $T_5$, $T_8$ and $T_{11}$ and the scanning switch 52 during $T_3$, $T_6$ and $T_9$.

If the scanning switches are closed alternately and in cyclic sequence the operation of the circuit according to FIG. 2 is in all other respects fully identical to that of FIG. 1.

If during the period $T_1$ the row m is energized and all display elements $2_{m,j}$ ignited, then the display elements of the rows m−1 and m+1 have a reduced ignition-voltage owing to the pre-ionisation present. At the end of $T_1$ the scanning switch 50 opens and the scanning switch 51 closes while the scanning switch 52 remains open. As the row m−1 is not energized only the display elements of the row m+1 will take over the ignition from the display elements of the row m. Opening the scanning switch 50 causes the display elements of row m to extinguish. Depending on the associated selection signals a plurality of the display elements of the row m+1 will only carry the quiescent current and light up weakly and a plurality of other display elements of this row will light up brightly during the entire period $T_2$ or will light up more or less brightly during a portion of the period $T_2$ if pulse width modulation or amplitude modulation is applied.

In the period $T_3$ the display elements of the row m+2 ignite in the same manner, etc.

The pre-ionisation of the first row in this circuit is also obtained in known manner by means of a reset cathode, not shown.

Figure 3:
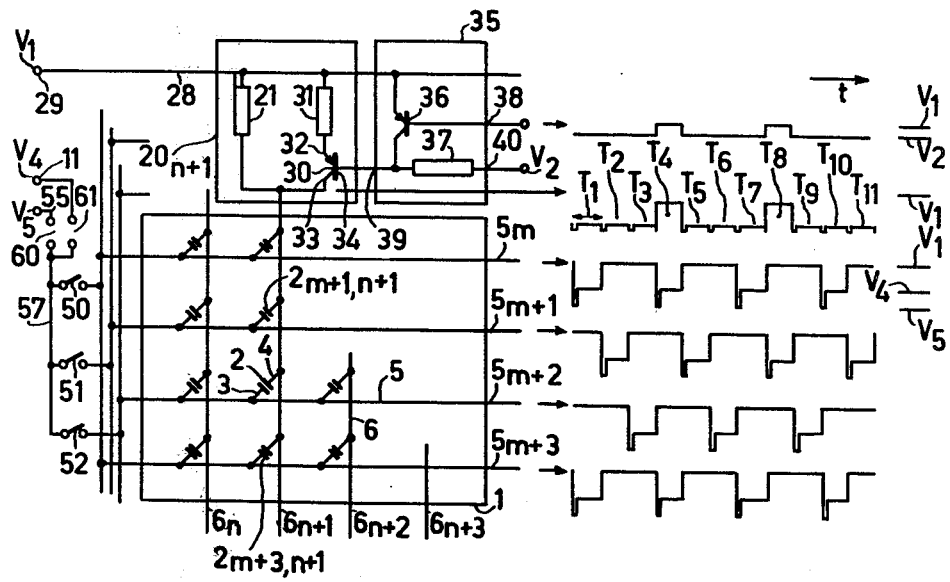
FIG. 3 shows by means of a simplified circuit diagram a display device according to the invention wherein an additional supply voltage for the ignition is supplied to display elements through a plurality of row conductors.

FIG. 3 shows an embodiment of a display device according to the invention wherein the temporary increase in the voltage which is required for igniting the display element is supplied through the row conductors instead of through the column conductors. Herewith the common connections of the switches 50, 51 and 52 are coupled through a conductor 57 and a switch 61 to the supply input 11 to which a supply voltage $V_4$ can be supplied and through a switch 60 to a supply input 55 of the display device to which a supply voltage $V_5$ can be supplied. This voltage $V_5$ has been chosen such that $V_4 - V_5$ is equal to, or approximately equal to, the voltage difference $V_3 - V_1$ in the display devices of FIG. 1 and FIG. 2. The switch 60 is closed during each period portion $T_{i1}$ and the switch 61 is closed during each period portion $T_{i2}$. The resistors 21 which serve as quiescent current supply circuits are now connected each time between an associated column conductor on the one hand and the supply input 29 on the other hand.

For igniting display elements a voltage $V_1 - V_5$ is available during the period portions $T_{i1}$. As the voltages have been chosen such that $V_4 - V_5 = V_3 - V_1$ and thus $V_1 - V_5 = V_3 - V_4$, that is to say the available ignition-voltage is equally great as in the embodiment of FIG. 1 and FIG. 2. During the period portions $T_{i2}$ a supply voltage $V_1 - V_4$ is available for maintaining the ignition as in the other embodiments. In other respects the operation of the display device according to FIG. 3 is fully identical to the operation of the embodiment of FIG. 2.

If so desired, in a column selection circuit 20 the resistor 21 may be connected to the emitter 32 of the transistor 30 instead of to the supply terminal 29. This results in a negligible reduction in the quiescent current as the resistors 21 have a much greater resistance than the resistors 31, for example, a resistance value which is fifty times as great. Depending on the available standard resistance values and their required tolerances a somewhat lower resistance value may possibly be chosen for the resistance value of the resistors 21 than in the preceding embodiments but in general a difference of approximately 2% in the quiescent currents will fall within the measuring accuracy. A likewise small reduction occurs in the display current which might be compensated by adapting the choice of the resistance value of the resistor 31. The attainable contrast remains the same.

Figure 4:
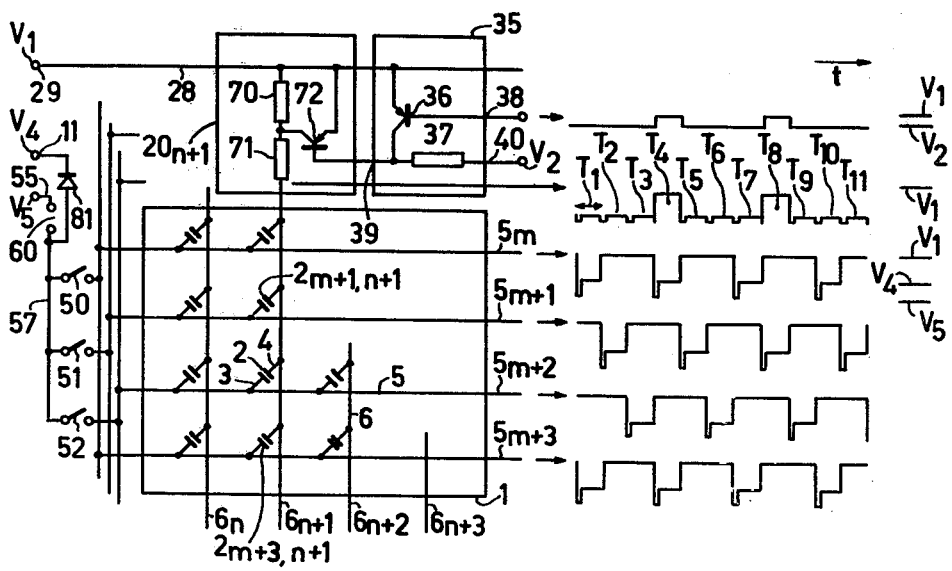
FIG. 4 shows by means of a simplified circuit diagram a display device as in FIG. 3 with a different effectuation of the excitation of the column conductors.

FIG. 4 shows a fourth embodiment of a display device according to the invention. Herein the quiescent current supply circuit of the column selection circuits comprises a series arrangement of two resistors 70 and 71 and the selection circuit comprises a transistor 72 which shunts the resistor 70. The emitter of the transistor 72 and one side of the resistor 70 are connected to the supply input 29 of the display device. The collector of the transistor 72 and the other side of the resistor 70 are connected to one side of the resistor 71 whose other side is connected to the corresponding column conductor. The base of transistor 72 is connected to the output 39 of the gate circuit 35. If the corresponding column conductor is selected the transistor 72 conducts, the resistor is short-circuited and the display current through the display elements which couples the corresponding column conductor to the row conductor scanned at that moment is determined substantially exclusively by the resistor 71. In the non-selected case the quiescent current is determined by the sum of the resistance value of the resistor 71 and the much higher resistance value of the resistor 70. In this circuit the series arrangement of resistor 71 and transistor 72 does not act as a current source circuit, the transistor 72 serves as a switch only. Consequently the control of the display elements becomes somewhat more dependent on the spread in the operating voltages. This is offset by the advantage that the gate circuits 35 may be dispensed with if the selection signal is also available in the inverse logic polarity in the logic control circuit. Especially with large display devices having many column conductors this may furnish a considerable savings.

At the same time FIG. 4 shows how in the row selection circuit the switch 61 (FIG. 3) can be replaced by a diode 81 whose cathode is connected to the supply input 11 of the display device and the anode to the conductor 57. If during $T_{i1}$ the switch 60 is closed the conductor 57 receives a voltage $V_5 < V_4$ so that the diode 81 is non-conducting. As soon as the switch opens during $T_{i2}$ the diode conducts so that the conductor 57 is brought to a voltage approximately equal to $V_4$ as the reset cathode of one of the row conductors carries at least L quiescent currents and not more than 1 display currents.

It is easy to see that other combinations of the various types of column selection circuits and row scanning circuits than those shown are possible. A person skilled in the art will be able to replace switches by semiconductors or to replace the shown pnp-and-npn transistors respectively by, for example, MOS transistors. Likewise the selected semiconductors can be combined together with other components into an integrated circuit, for example with the logic control circuit. In the chosen embodiments it invariably applied that $V_3 > V_1 > V_4 > V_5$. If so desired it is possible to drive the display device with inverse polarities wherein $V_3 < V_1 < V_4 < V_5$, while adapting the type-selection for the semiconductor switches. In general, in view of the coupling to the logic control circuits it will be desirable to select the supply voltage $V_1$ at chassis potential.

What is claimed is:

1. A display device comprising a matrix of d.c. gas discharge display elements disposed together in a gas-filled space and each having a bistable current-voltage characteristic and a first and a second supply electrode, a control circuit having a plurality of row conductors and a plurality of column conductors, means connecting the first supply electrode of each display element to one of the row conductors and the second supply electrode to one of the column conductors such that each display element couples a different combination of a row conductor and a column conductor, a row scanning circuit for successively periodically scanning each of the row conductors for a given period, a plurality of column selection circuits for selecting those display elements to be energized with a d.c. display current during said given period in which a row conductor is scanned, which column selection circuits effect at the beginning of the scan of a row conductor the excitation of all display elements connected to the scanned row conductor, each column selection circuit comprising a quiescent current supply circuit which couples a column conductor to a d.c. voltage source for supplying a quiescent current to the non-selected display elements connected to the scanned row conductor during said given period and at a level to produce a gas discharge in the display elements of the row conductor scanned, said quiescent current having a low value such that the display level of the non-selected display elements is negligible relative to the display level of selected display elements.

2. A display device as claimed in claim 1, wherein the row scanning circuit supplies scanning pulses to the row conductors so that at the beginning of a given period in which a row conductor is scanned a voltage is supplied to the scanned row conductor for igniting the display elements connected to said row conductor and during the remaining part of that period a voltage is coupled to said row conductor for maintaining a current through the display elements connected to said row conductor.

3. A display device as claimed in claim 1 wherein the quiescent current supply circuit comprises a resistor which couples the associated column conductor to the d.c. voltage source for supplying a quiescent current to the display elements and said column selection circuit further comprises a series arrangement of a resistor and a selection switch which series arrangement couples the associated column conductor to a d.c. voltage source for supplying a display current to the display elements.

4. A display device as claimed in claim 1, wherein the d.c. voltage source for supplying a quiescent current supplies a pulsating d.c. voltage such that, at the beginning of each given period wherein a row conductor is scanned, a voltage is supplied to the column conductors for igniting the display elements connected to the scanned row conductor and during the remaining part of the given period a voltage is supplied to the column conductors for maintaining a current through these display elements.

5. A display device as claimed in claim 1 wherein a column selection circuit comprises a series arrangement of a resistor and a selection switch which couples the associated column conductor to a d.c. voltage source and wherein the quiescent current supply circuit shunts the selection switch.

6. A display device as claimed in claim 1 wherein the row conductors are mutually interconnected in at least three groups such that there are at all times between two row conductors of the same group at least two row conductors of another group, the row scanning circuit including means for supplying periodically and in cyclic sequence scanning pulses to the groups of row conductors.

7. A display device as claimed in claim 1 wherein the display device further comprises a setting circuit for setting a desired luminous display level and a selection-pulse circuit which supplies selection pulses for controlling the column selection circuits, the form of the selection pulses being determined by the setting circuit such that the current through a selected display element furnishes the desired luminous display level.

8. A display device comprising a matrix of d.c. gas discharge display elements having a bistable current-voltage characteristic and disposed within a gas-filled space, a corresponding matrix of row and column conductors with each display element connected to a different combination of a row and column conductor, a row scanning circuit for periodically energizing the row conductors in sequence each for a given period, column selection circuit means for supplying during said given periods a d.c. display current to selected display elements of the row conductor being scanned, the column selection circuit means including means for energizing all of the display elements connected to a scanned row conductor at the start of the scan of said row conductor, and quiescent current supply circuit means for coupling the column conductors to a d.c. voltage source thereby to supply a quiescent current to the non-selected display elements connected to a scanned row conductor and at a level sufficient to produce a gas discharge therein which has a luminous level that is negligible relative to the luminous level of the gas discharge produced in selected display elements.

9. A display device as claimed in claim 8 wherein said quiescent current supply circuit means includes means for supplying a first level of d.c. voltage to the column conductors at the start of each said given row scanning period sufficient to ignite the display elements connected to the scanned row conductor and for supplying a second lower level of d.c. voltage to the column conductors during the remaining part of said given period which is sufficient to maintain a quiescent current flow in said display elements during said remaining part of the given period.

10. A display device as claimed in claim 8 wherein the column selection circuit means includes switching means for selectively coupling the column conductors to a d.c. current source and means for controlling the on-off time of said switching means so as to vary the pulse width of selection current pulses applied to selected display elements during said given periods.

* * * * *